United States Patent
Gilbert et al.

(10) Patent No.: US 7,292,137 B2
(45) Date of Patent: Nov. 6, 2007

(54) ENERGY EFFICIENT PASSIVE ENTRY SYSTEM

(75) Inventors: Carl L. Gilbert, Southfield, MI (US); Riad Ghabra, Dearborn Heights, MI (US); Shubha Channappa, South Lyon, MI (US)

(73) Assignee: Lear Corporation, Southfield, MI (US)

( * ) Notice: Subject to any disclaimer, the term of this patent is extended or adjusted under 35 U.S.C. 154(b) by 224 days.

(21) Appl. No.: 11/129,159

(22) Filed: May 13, 2005

(65) Prior Publication Data

US 2006/0255908 A1 Nov. 16, 2006

(51) Int. Cl.
*B60R 25/10* (2006.01)

(52) U.S. Cl. ............... 340/426.3; 340/426.16; 340/539.21; 340/5.61; 340/5.72; 455/127.9; 343/711; 307/10.1

(58) Field of Classification Search ............ 340/426.3, 340/5.72, 5.61, 572.7, 5.62, 5.63, 825.69, 340/426.16, 539.21; 455/127.2, 127.9; 343/711; 342/457, 126; 307/10.1
See application file for complete search history.

(56) References Cited

U.S. PATENT DOCUMENTS

| | | | |
|---|---|---|---|
| 4,688,036 A | | 8/1987 | Hirano et al. |
| 6,034,593 A | * | 3/2000 | Chase et al. ........... 340/426.36 |
| 6,317,035 B1 | * | 11/2001 | Berberich et al. ...... 340/426.13 |
| 6,570,486 B1 | * | 5/2003 | Simon et al. ................. 340/5.1 |
| 6,617,961 B1 | * | 9/2003 | Janssen et al. ............... 340/5.8 |
| 2005/0046546 A1 | * | 3/2005 | Masudaya ................... 340/5.61 |
| 2005/0046568 A1 | * | 3/2005 | Tanaka ................... 340/539.13 |
| 2005/0275511 A1 | | 12/2005 | Luo et al. |

FOREIGN PATENT DOCUMENTS

| | | |
|---|---|---|
| EP | 0950784 | 10/1999 |
| EP | 1211104 | 6/2002 |
| GB | 2415534 | 12/2005 |

* cited by examiner

*Primary Examiner*—Benjamin O. Lee
*Assistant Examiner*—Daniel Previl
(74) *Attorney, Agent, or Firm*—MacMillan Sobanski & Todd, LLC

(57) ABSTRACT

A passive entry system for a vehicle is provided that includes a vehicle-based communication module mounted in the vehicle and a portable communication device. The vehicle-based communication module includes a transmitter for transmitting a challenge signal to the portable communication device when in a polling state to determine a presence of the portable communication device for allowing access to the vehicle. The portable communication device includes a receiver for receiving the challenge signal and is responsive to the challenge signal when in a response state and non-responsive to the challenge signal when in a non-response state.

20 Claims, 3 Drawing Sheets

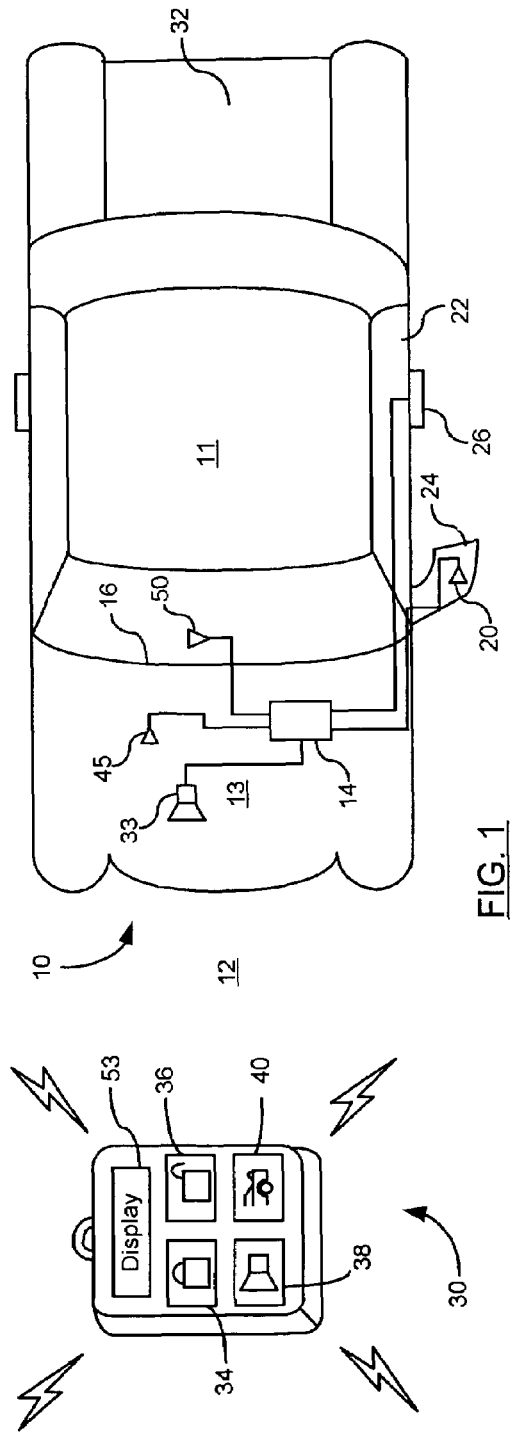
FIG. 1
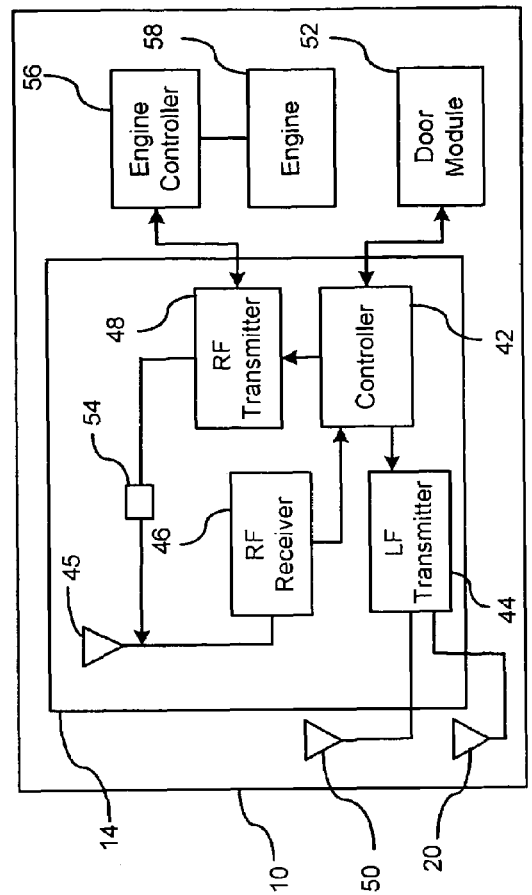
FIG. 2
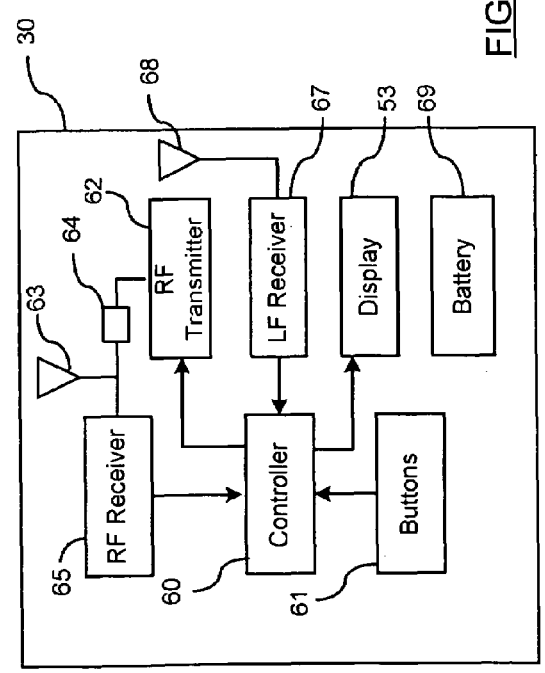

ENERGY EFFICIENT PASSIVE ENTRY SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a vehicle passive entry system, and more specifically, to power conservation in a remote keyless entry fob for a vehicle passive entry system.

2. Description of the Related Art

Remote entry vehicle systems are known in the auto industry for remotely accessing a vehicle without having to manually insert a key for unlocking the vehicle door. Such remote keyless systems are typically characterized as active or passive entry systems. Active entry systems require the user to manually activate a button on a portable communication device such as an RKE fob. The RKE fob when manually activated broadcasts a signal to a vehicle based communication module within the vehicle for receiving the signal and unlocking the vehicle accordingly.

Passive entry systems are passive in nature. That is, the user is not required to manually activate a button on the fob. In a polling passive entry system, the vehicle base communication module periodically transmits a challenge signal in the vicinity of the vehicle. When the fob is within a broadcast range of the challenge signal, the fob automatically broadcasts a response (RF) signal to the vehicle based communication module in response to the challenge signal. The vehicle based communication module receives the response signal, determines the authenticity of the fob, and actuates the vehicle unlock function accordingly.

Under normal operating conditions, the fob is powered at all times for sensing incoming signals from the vehicle base station. A receiver such as a low frequency (LF) receiver may be used for receiving a wakeup signal from the vehicle based communication module while all other components within the fob are in a sleep mode. This allows all other components within the fob to stay in a sleep mode thereby conserving power until a wakeup signal is received. When the portable communication device receives the wakeup signal, power is supplied to the RF transmitter for transmitting the challenge response signal. The portable communication device transmits a response (RF) signal in response to the challenge signal. Typically, very little power is consumed from the fob battery by the receiving circuits for continuous monitoring of the wakeup signal. A greater amount of power is consumed when the RF transmitter within the fob transmits a response signal in response to the challenge signal. Although the vehicle based communication module continuously transmits the wake up and challenge signals whenever the passive entry system is active, the fob is responsive to these signals only when the fob is within a broadcast reception region of the vehicle. As a result, battery drain under such conditions (i.e., when the fob is within the broadcast regions external to the vehicle) is minimal because such transmissions are infrequent and power is drawn only for a short duration of time (i.e., until the vehicle based communication module receives the broadcast signal and unlocks the vehicle doors). After activation of the passive entry system and the doors are unlocked, the vehicle based communication device terminates the broadcast of the wakeup signal and challenge signal.

If a fob is left within the interior region of the vehicle while the vehicle is locked and the engine is off (i.e., passive entry system active), then a significant drain on the fob battery may result as the fob will transmit a response signal each time a respective challenge signal is received. That is, if the vehicle based communication module identifies that the fob is within the interior of the vehicle, the vehicle door unlock function will not be actuated. The vehicle based communication module, however, will continue to transmit wake-up signals in the course of normal operation until a response signal is received from an authenticated fob located in the exterior to the vehicle. In the interim, the fob located within the interior of the vehicle will continue to transmit response signals and significant power drain on the fob battery may occur as a result.

SUMMARY OF THE INVENTION

The present invention has the advantage of passively sensing for a portable communication device for actuating a vehicle lock mechanism when in a broadcasting range of the vehicle.

The present invention has the further advantage of determining whether the portable communication device is within an interior region or exterior region of the vehicle and conserving power drawn from the portable communication device when within the internal region of the vehicle. Upon detecting the portable communication device within the interior region of the vehicle, the portable communication device enters a non-response state such that the portable communication device becomes non-responsive to any challenge signals broadcast from the vehicle, and as a result, power drawn by the portable communication device is conserved.

The present invention has the further advantage of powering down the portable communication device where challenge signals are neither received nor are response signals transmitted by the portable communication device when in the non-response state, while other respective portable communication devices outside the vehicle remain operational for passive entry.

In one aspect of the present invention, a passive entry system for a vehicle is provided that includes a vehicle-based communication module mounted in the vehicle and a portable communication device. The vehicle-based communication module includes a transmitter for transmitting a challenge signal to the portable communication device when in a polling state to determine a presence of the portable communication device for allowing access to the vehicle. The portable communication device includes a receiver for receiving the challenge signal and is responsive to the challenge signal when in a response state and non-responsive to the challenge signal when in a non-response state.

BRIEF DESCRIPTION OF THE DRAWINGS

FIG. 1 is a system diagram of a vehicular integrated remote keyless-passive entry system according to a preferred embodiment of the present invention.

FIG. 2 is a schematic block diagram of the remote keyless-passive entry system according to a preferred embodiment of the present invention.

DETAILED DESCRIPTION OF PREFERRED EMBODIMENTS

Figure 3:
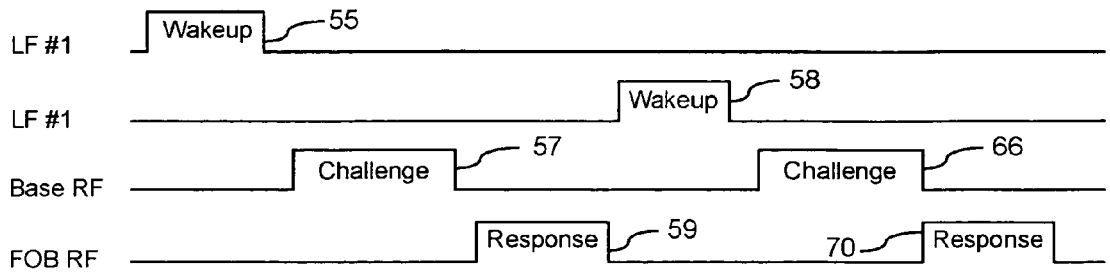
FIG. 3 is a timing diagram of signal exchanges in a preferred embodiment of the present invention.

Referring to FIG. 1, a vehicle 10 has an interior region 11 and an exterior region 12. A vehicle based communication module 14 is mounted on said vehicle 10 such as in an engine compartment 15 or within a vehicle instrument panel 16. The vehicle based communication module 14 is coupled to a first exterior antenna 20, which may be mounted in an exterior structure of the vehicle 10 such as a vehicle door 22, a side view mirror housing 24, or the engine compartment 15. Additional transmitters or antennas may be mounted to the vehicle 10 at various passive entry zone locations remote from the vehicle based communication module 14, if desired. The vehicle door 22 provides a secure entry barrier between the interior region 11 and the exterior region 12.

In a polling passive entry system, the vehicle based communication module 14 periodically broadcasts a wakeup signal for determining the presence of an authorized portable communication device 30. The portable communication device 30 such as a remote keyless entry (RKE) fob broadcasts RF signals to a vehicle based communication module 14 for remotely actuating various vehicle entry functions such as unlocking and locking the vehicle door 22, unlatching a trunk 32, and for activating and deactivating a vehicle alarm system 33. A vehicle lock switch 34 and a vehicle unlock switch 36 are commonly disposed on a face of the portable communication device 30. The portable communication device 30 may further include a trunk unlatch switch 38 and alarm switch 40 for activating and deactivating the vehicle alarm 33. The portable communication device 30 typically broadcasts the RF signals at a maximum power level that is regulated by the FCC. Based on the sensitivity of a respective receiver, the vehicle based communication module 14 receives the RF signal when the vehicle 10 (i.e., vehicle based communication module 14) is within the broadcasting range of the portable communication device 30. The vehicle based communication module 14 determines the validity of the RF signal broadcast by the portable communication device 30 for actuating vehicle entry functions. The portable communication device 30 includes additional receivers for combining passive entry functionality and active keyless entry functionality within the portable communication device 30.

FIG. 2 illustrates a schematic block diagram of a preferred embodiment of the integrated two-way RKE and passive entry system. The integrated two-way RKE and passive entry system is shown in co-pending application entitled "Integrated Passive Entry And Remote Keyless Entry System", Ser. No. 10/999,503, filed Nov. 30, 2004, which is incorporated by reference herein.

The vehicle based communication module 14 includes a microcontroller 42 coupled to a LF transmitter 44, a RF receiver 46, and a RF transmitter 48. In certain embodiments of the present invention, additional LF transmitters or LF antennas may be provided. The additional transmitters or antennas may be located in the vehicle remotely from vehicle based communication module at an entry zone being monitored by a passive entry system, for example. A single LF transmitter 44 may also use a plurality of LF antennas at respective locations within the vehicle 10 such as a LF antenna 50 deployed within the interior region 11 of the vehicle 10 in addition to LF antenna 20 deployed in the side view mirror housing 24. A door module 52 is coupled to microcontroller 42 for receiving door lock/unlock request signals from various devices including the vehicle based communication module 14 for remotely locking and unlocking a corresponding door lock. A RF antenna 45 is coupled to RF receiver 46 as well as to RF transmitter 48 through a matching circuit 54 for transmitting challenge signals and for receiving response signals.

Portable communication device 30 includes a microcontroller 60 coupled to input buttons 61 that typically include separate push buttons for activating RKE commands for locking and unlocking doors, remotely starting or stopping an engine, panic alarm, and others. A RF transmitter 62 is coupled to an antenna 63 through a matching network 64. RKE commands initiated by depressing a push button 61 are broadcast by the RF transmitter 62 and antenna 63. A RF receiver 65 is coupled to antenna 63 and microcontroller 60 for receiving UHF status messages broadcast by vehicle based communication module 14, such as engine running status for a remote start function. A display 53 is coupled to microcontroller 60 for displaying vehicle status data from a status message to a user.

A LF receiver 67 is coupled to the microcontroller 60 and to a LF antenna 68 for detecting wakeup signals broadcast from vehicle 10. A battery 69 in the portable communication device 30 supplies electrical power to all the other components of portable communication device 30 during normal operation.

In operation, a typical polling passive entry sequence begins by generating a LF wakeup signal to activate the LF receiver 67 in the portable communication device 30 via antennas 20 and 68. The LF wakeup signal is also used to localize the portable communication device based on whether LF transmitter antenna 50 or any additional LF transmitter antenna generates the strongest received LF wakeup signal in portable communication device 30. The LF wakeup signal has a known format including an operation code for identifying the signal as a wakeup signal and preferably also including an antenna identifier unique to the antenna being used to transmit each LF wake-up signal. Localization of the portable communication device 30 is necessary to ensure that a person carrying an authorized portable communication device is properly located in the area where the passive function is being requested (e.g., located outside the door for activating a passive entry function or located in the passenger compartment).

LF receiver 67 preferably includes circuitry for measuring a received signal strength indicator (RSSI) at which the LF wakeup signals received. The awakened microcontroller 60 stores the RSSI data as part of response data to be sent back to vehicle based communication module 14. Also after being awakened, RF receiver 65 is activated in order to receive an expected challenge signal from vehicle based communication module 14 as part of a conventional interrogation/response validation sequence. For example, microcontroller 42 in vehicle based communication module 14 generates a random number to be used as a seed number in a secret mathematical transformation that is also known to the microcontroller 60 in the portable communication device 30. RF transmitter 48 in vehicle based communication module 14 is used broadcast a UHF challenge signal including the random number. RF receiver 65 in the portable communication device 30 receives the UHF challenge signal and the microcontroller 60 passes the random number through the known mathematical transformation. The resulting transformed number is included in response data together with the RSSI signal and a portable communication device identifier for inclusion in a UHF response signal broadcast via RF transmitter 62 and antenna 63. The UHF interrogation and response signals are sent with a much shorter time delay than if they were sent at the low frequency. The interrogation and response may both be sent at 9.6k baud, for example. The UHF response signal is received by RF receiver 46 via antenna 45 in vehicle based communication module 14 and is processed by microcontroller 42 in a known manner. For instance, microcontroller 42 checks the transformed number as received from portable communication device 30 with its own results of the transformation and determines the UHF response signal to be valid if the transformed numbers match.

Portable communication device 30 and vehicle based communication module 14 also function to provide remote keyless entry functions in a conventional manner. Thus, when a user presses a manual input key (i.e., push button) 61 for a desired remote control function, a UHF control signal incorporating a remote control message having a corresponding function identifier and a pre-assigned fob ID is broadcast. When vehicle based communication module 14 receives a UHF control signal, it validates the fob ID and any security codes and then initiates the remote control function via a vehicle message sent from vehicle based communication module 14 to an actuator such as door module 52 or engine controller 56. Typical remote control commands include locking all doors, unlocking a driver's door, unlocking all doors, unlocking a trunk, activating a panic alarm, remotely starting an engine, activating a climate control, deactivating an engine, deactivating a climate control, and requesting vehicle status data to be provided in a UHF status message.

FIG. 3 shows a first preferred embodiment for localizing a passive communication device in a passive entry sequence wherein it is desired to determine whether the passive communication device is in an exterior region of the vehicle or within an interior region of the vehicle. A first LF wakeup signal 55 is generated from a first antenna preferentially transmitting to a first area with respect to the vehicle (e.g., outside the vehicle adjacent to a particular door or other closure such as a trunk). After waiting an amount of time sufficient to allow the portable communication device to awaken, the base station sends a challenge signal 57 via the base station RF transmitter and antenna. If the portable communication device is in fact in the first area being preferentially transmitted to, then after receiving the challenge signal and formulating response data the portable communication device RF transmitter sends a UHF response signal 59. When the portable communication device is located in the area, then the response includes RSSI data showing strong reception. If outside the first area, then the RSSI data will reflect a weak signal. If the portable communication device is not close enough to the target area, the wakeup signal will not have been received and there will no response to the challenge signal at all. In order to poll an additional location, a LF wakeup signal 58 is sent via a second LF antenna preferentially transmitting to a second area (e.g., inside the vehicle). Following sufficient time to allow a passive communication device to awaken, a UHF challenge signal 66 is sent via the RF transmitter in the base station. If a passive communication device was awakened in the desired location being polled, a UHF response signal 70 is sent from the passive communication device RF transmitter to the base station RF receiver. Various areas are polled to distinguish whether the portable communication device is within the interior region or exterior region of the vehicle such as near the driver's side or passenger's side of the vehicle.

As discussed earlier, significant power drain may occur if a portable communication device is left within the interior of the vehicle while the vehicle is locked and the vehicle based communication module actively broadcasts wakeup and interrogations signals which the portable communication device responds to. To prevent significant battery drain of the battery 69 from occurring when the portable communication device 30 is within the interior region 11 (i.e., while the passive entry monitoring system is active), the portable communication device 30 is commanded to enter a non-response state. All other respective portable communication devices associated with the passive entry system continue to operate in a response state. In a first preferred embodiment, when in the non-response state, power is maintained to the LF receiver 67 for receiving wakeup signals. However, no response signal is transmitted by the RF transmitter 62 of the portable communication device 30 to the ongoing polling signals. This non-response state is enabled when the RF transmitter 48 of the vehicle based communication module 14 broadcasts a lockout signal via antenna 45 to the portable communication device 30 in response a determination that the portable communication device 30 is within the interior of the vehicle 10 based on a last received response signal. The lockout signal (e.g., challenge signal with an op code commanding the non-response state be entered) is received by the RF receiver 65 via antenna 63 of the portable communication device 30. The received lockout signal is provided to the microcontroller 60 where the microcontroller 60 thereafter enables the non-response state.

The portable communication device 30 at predetermined time intervals may exit the non-response state and await a wakeup signal from the vehicle based communication module 14 for determining whether the portable communication device 30 is within the interior region 11 of the vehicle 10. Alternatively, the microcontroller 42 of the vehicle based communication module 14 may broadcast an exit signal to the portable communication device 30 to exit the non-response state (e.g., challenge signal with an op code to respond to the challenge signal) for determining whether the portable communication device 30 is within the interior region of the vehicle 10. If the microcontroller 42 of the vehicle based communication module 14 determines that the portable communication device 30 is not within the interior region 11 of the vehicle 10, then the portable communication device 30 will remain in the response state.

In an alternative embodiment, the non-response state may include a power down state. That is, either the portable communication device 30 will power down immediately upon receiving a lockout signal and no power will be provided to either of the transmitting or receiving devices of the portable communication device 30. The portable communication device may be powered up at predetermined time intervals for determining whether at least one of a plurality of predetermined conditions has occurred for restoring the response state.

In yet another alternative embodiment, a combined non-response state (e.g., where the portable communication device can receive signals but not transmit) and the power down state may be utilized. The portable communication device 30 may first enter a non-response state when a determination is initially made that portable communication device is within the interior region 11 of the vehicle 10. If a determination is made that the portable communication device 30 has remained within the interior region 11 of the vehicle 10 for the extended period of time, then the portable communication device 30 is commanded to power down. This may be initiated by the microcontroller 60 of the portable communication device 30 or the microcontroller 42 of the vehicle based communication module 14 requests the portable communication device 30 to power down and enter a sleep mode. The portable communication device 30 may thereafter periodically awaken from the sleep mode after a first predetermined period of time has elapsed.

Figure 4:
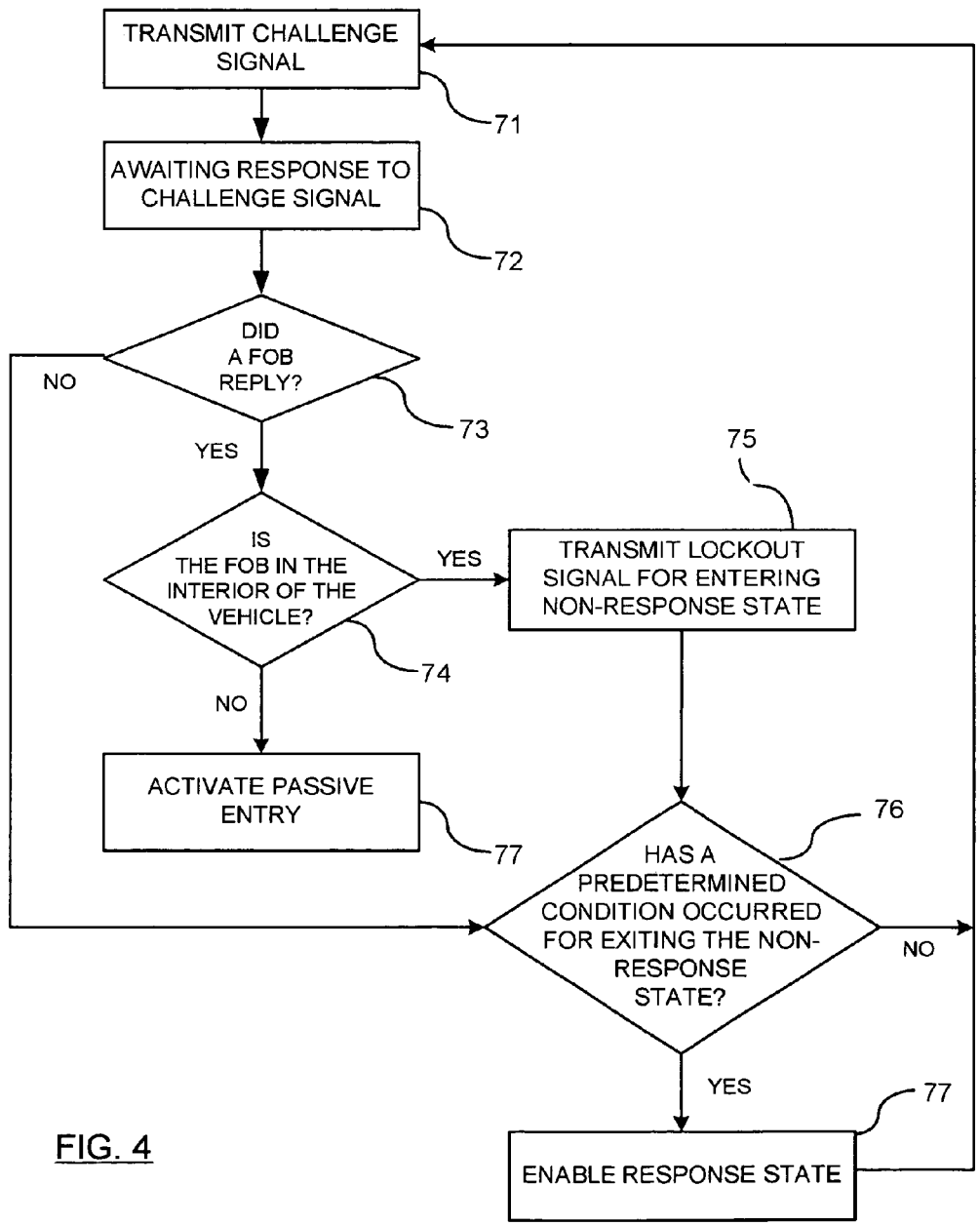
FIG. 4 is a flowchart for conserving power in a portable communication device according to a first preferred embodiment of the present invention.

FIG. 4 illustrates a method of entering the non-response state according a first preferred embodiment of the present invention. In step 71, a challenge signal is transmitted from the vehicle based communication module to a broadcast region around the vehicle. Such a broadcast region includes interior and exterior regions. In step 72, the vehicle based communication module awaits a response from a portable communication device.

In step 73, a determination is made whether a portable communication device has responded. If the determination is made, in step 73, that a response is received from at least one portable communication device, then a determination is made in step 74 as to whether the portable communication device responding to the challenge signal is within an interior region of the vehicle or exterior region of the vehicle. If the determination is made in step 74 that the portable communication device is not within the interior region, then the passive entry system is activated in step 77. If the determination is made that the portable communication device is within the interior region of the vehicle, then a lockout signal is broadcast by the vehicle based communication module to the portable communication device to enter a non-response state in step 75. Preferably, when in the non-response state incoming signals are received but no response signals are transmitted. Alternatively, the non-response state may include a power down state where the portable communication device neither receives nor transmits signals. The microcontroller of the vehicle based communication module determines the location of the portable communication device as discussed earlier. The microcontroller in response to determining the location of the portable communication device within the interior region broadcasts the lockout signal via the vehicle communication module's RF transmitter and antenna.

In step 76, a determination is made whether a predetermined condition has occurred for exiting the non-response state. Such predetermined conditions include being in a non-response state for an extended period of time, or actuation of a passive entry button such as door unlock or engine start. When the portable communication device is in the non-response state for an extended period of time, the portable communication device may exit the non-response state in response thereto for responding to a challenge signal for determining whether the portable communication device is still within the interior region of the vehicle. If no predetermined condition occurred in step 76, then a return is made to step 71.

If the determination is made in step 76 that at least one predetermined condition has occurred, then the portable communication device enters the response state in step 77. A return to step 71 is made thereafter.

Figure 5:
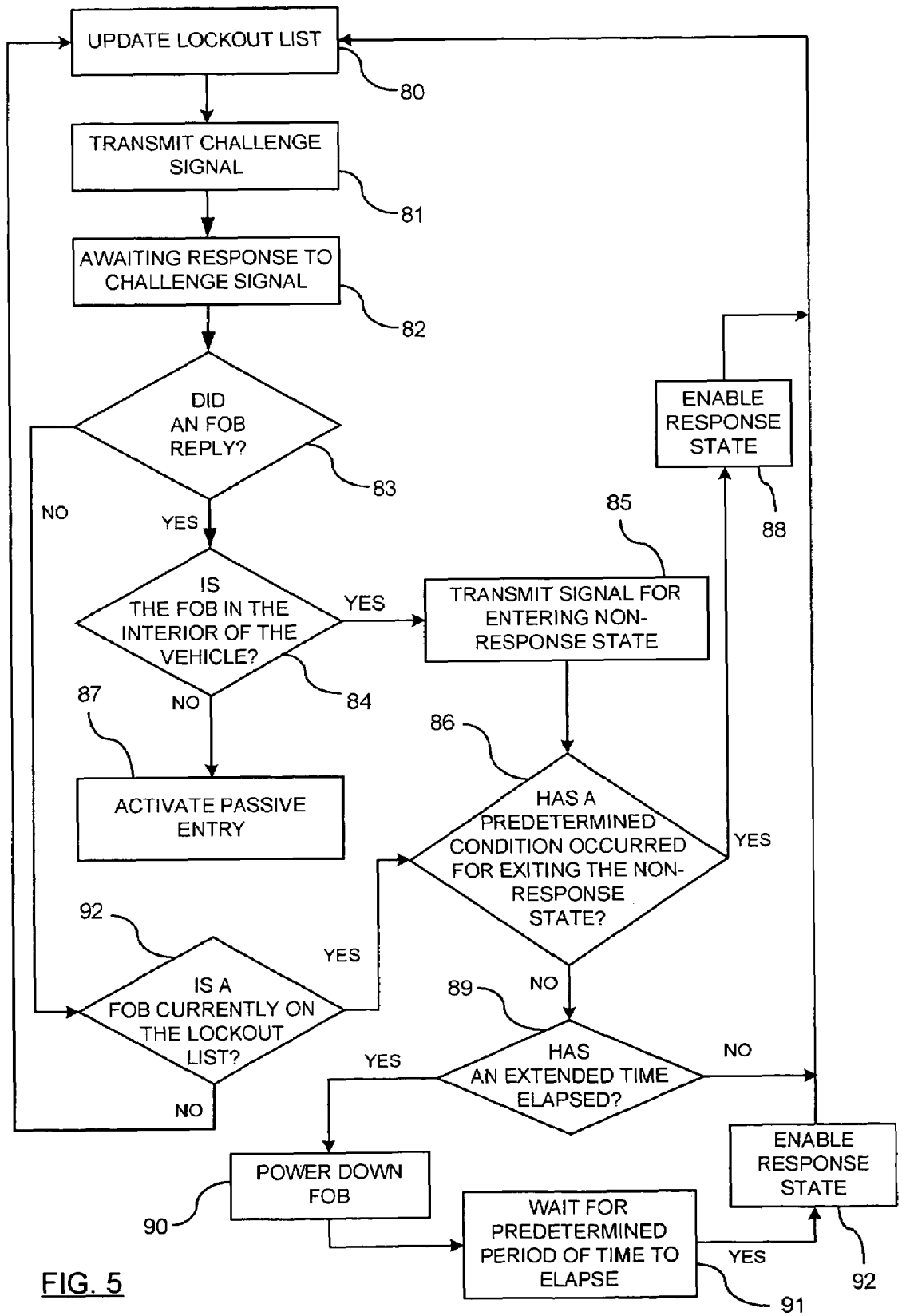
FIG. 5 is a flowchart for conserving power in a portable communication device according to a second preferred embodiment of the present invention.

FIG. 5 illustrates a method of entering a non-response state according a second preferred embodiment of the present invention. In step 80, the microcontroller of the vehicle based communication module updates a lockout list. The lockout list includes identifiers (e.g., ID codes) of respective portable communication devices that are authorized for vehicle entry, but the last known status indicates that the respective portable communication devices are within the interior region of the vehicle and are currently in either a non-response state or a power down state. The lockout list is updated each time a respective wakeup signal is broadcast or when the vehicle receives a RKE signal from the portable communication device. A respective portable communication device may be removed from the list when a determination is made that the device is removed from the vehicle, or the lock mechanism has been deactivated, or that the passive entry system has been deactivated, or that the portable communication device is transmitting a signal (i.e., an RKE signal). In step 81, a challenge signal is transmitted from the vehicle based communication module to a broadcast region about the vehicle. Such a broadcast region includes interior and exterior regions.

In step 82, the vehicle based communication module awaits a response from a portable communication device. In step 83, a determination is made whether any portable communication devices have responded to the challenge signal. If a determination is made that no respective portable communication devices responded, then a determination is made, in step 92, as to whether any portable communication device is currently listed on the lockout list. This is performed to verify whether there are any portable communication devices currently in a non-response state or power down state, and if so, whether any conditions exist for commanding that they exit the non-response state. If a determination is made that no portable communication devices are currently on the lockout list, then a return is made to step 80. If a respective portable communication device is currently on the lockout list, then a determination is made in step 86 as to whether at least one predetermined condition has occurred for exiting the response state.

If the determination made, in step 83, that a response was received from at least one portable communication device, then a determination is made in step 84 as to whether the portable communication device responding to the challenge signal is within an interior region of the vehicle or exterior to the vehicle. If the determination is made in step 84 that the portable communication device is not within the interior region, then the passive entry system may be activated in step 87, if appropriate. If the determination is made that the portable communication device is within the interior region of the vehicle, then a lockout signal is broadcast by the vehicle based communication module to the portable communication device to enter a non-response state in step 85. The microcontroller of the vehicle based communication module determines the location of the portable communication device as discussed earlier. The microcontroller in response to determining that the portable communication device is within the interior region broadcasts the lockout signal via the vehicle communication module's RF transmitter and antenna.

In step 86, the determination is made whether at least one predetermined condition has occurred for exiting the non-response state. If the determination is made that at least one predetermined condition has occurred, then the portable communication device enters the response state, in step 88. A predetermined condition as discussed earlier signifies that either a vehicle function has been actuated or that the user of the vehicle is accessing the vehicle, and as result, the passive entry system is thereafter disabled. A return is made to step 80 to update the lockout list.

If the determination is made that no predetermined conditions have occurred, then a determination is made in step 89 of whether the portable communication device is located within the interior region of the vehicle for an extended period of time. The purpose of determining whether the portable communication device is within the interior region for the extended period of time is to determine whether to power down the portable communication device for conserving power.

If the determination made in step 89 is that the extended period of time has not elapsed indicating that the portable communication device has not been in the interior region continuously for the extended period of time, then a return is made to step 80.

If the determination is made in step 89 that the portable communication device is within the interior region for the extended period of time, then the portable communication device enters a power down state in step 90. This determination may be made by the microcontroller of the portable communication device by monitoring the period of time that has elapsed while in the interior region of the vehicle, or alternatively, the microcontroller of the vehicle base communication module may record the length of time and broadcast a command to the portable communication device to enter the power down state. When in the power down state, no power is provided to the receiver and transmitter of the portable communication device until at least one predetermined condition occurs. The microcontroller enters the power down state with only limited power provided to the microcontroller.

Once a respective portable communication device enters a power down state, the portable communication device is powered up after a predetermined period of time has elapsed. In step 91, the microcontroller of the portable communication device awaits a predetermined period of time to elapse before powering up the portable communication device and enabling the response state in step 92. A return is then made to step 80 to await a wakeup signal and update the lockout list. Alternatively, the microcontroller of the portable communication device may power up the portable communication device and enter the response state prior to the predetermined period of time elapsing if the microcontroller determines that an RKE function on the portable communication device has been actuated. This implies that the user has retrieved the portable communication device and is actively initiating a RKE function via the portable communication device.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A passive entry system for a vehicle comprising:
   a vehicle-based communication system mounted in a vehicle; and
   a portable communication device;
   wherein said vehicle-based communication system includes a transmitter for transmitting a challenge signal to said portable communication device when in a polling state to determine a presence of said portable communication device for allowing access to said vehicle;
   wherein said portable communication device includes a receiver for receiving said challenge signal, and wherein said portable communication device is responsive to said challenge signal when in a response state and non-responsive to said challenge signal when in a non-response state, said portable communication device being placed into said non-response state in response to receiving a lock-out signal from said vehicle based communication system.

2. The passive entry system of claim 1 wherein said portable communication device continuously receives said challenge signal from said vehicle based communication module while in said non-response state.

3. The passive entry system of claim 2 wherein said non-response state includes a power down state for terminating power to said receiver and transmitter.

4. The passive entry system of claim 3 wherein said vehicle-based communication system determines whether said portable communication device is within an interior of said vehicle for an extended period of time and transmits a power down signal for placing said portable communication device into a power down state.

5. The passive entry system of claim 4 wherein said portable communication device is powered up after a first predetermined period of time.

6. The passive entry system of claim 4 wherein said portable communication device is powered up on a manual button actuation of said portable communication device.

7. The passive entry system of claim 1 wherein said vehicle-based communication system determines whether said portable communication device is within an interior of said vehicle and transmits said lockout signal for placing said portable communication device into said non-response state.

8. The passive entry system of claim 7 wherein said vehicle based communication module transmits an exit signal to said portable communication device for exiting said non-response state.

9. The passive entry system of claim 8 wherein said exit signal is transmitted in response to said vehicle based communication module determining said portable communication device is exterior to said vehicle.

10. The passive entry system of claim 8 wherein said exit signal is transmitted in response to said vehicle-based communication system receiving an unlock request signal from a respective keyless entry device.

11. The passive entry system of claim 8 wherein said exit signal is transmitted after a predetermined period of time.

12. A method for conserving power in a portable communication device of a vehicular passive entry system, the method comprising the steps of:
    broadcasting a challenge signal from a vehicle base communication module to said portable communication device;
    broadcasting a response signal in response to said challenge signal;
    determining if said portable communication device is within an interior region of said vehicle; and
    broadcasting a lockout signal for placing said portable communication device into a non-response state it said portable communication device is within said interior of said vehicle.

13. The method of claim 12 wherein said portable communication device only receives challenge signals when in said non-response state.

14. The method of claim 13 further comprising the step of transmitting an exit signal to said portable communication device for determining said location of said portable communication device.

15. The method of claim 14 wherein said exit signal is transmitted in response to at least one predetermined condition occurring.

16. The method of claim 12 wherein said portable communication device neither receives challenge signals nor transmits response signals when in said non-response state.

17. The method of claim 16 wherein said predetermined condition is selected from the group comprising elapse of an extended period of time, activation of a vehicle function, and actuation of said portable communication device function.

18. The method of claim 12 further comprising the step of determining whether said portable communication device is within an interior region of said vehicle for an extended period of time and transmitting a power down signal for placing said portable communication device into a power down state wherein power to said receiver is terminated while in said power down state.

19. The method of claim 18 further comprising a step of powering up said portable communication device after a first predetermined period of time.

20. The method of claim 18 further comprising the step of powering up said portable communication device in response to a manual button activation of said portable communication device button.

* * * * *